US007921294B2

(12) United States Patent
Greco et al.

(10) Patent No.: US 7,921,294 B2
(45) Date of Patent: Apr. 5, 2011

(54) VERIFICATION OF ENCRYPTION KEY

(75) Inventors: Paul Merrill Greco, Tucson, AZ (US); Shai Halevi, Elmsford, NY (US); Glen Alan Jaquette, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 994 days.

(21) Appl. No.: 11/530,009

(22) Filed: Sep. 7, 2006

(65) Prior Publication Data

US 2008/0077797 A1   Mar. 27, 2008

(51) Int. Cl.
*H04L 9/00* (2006.01)
(52) U.S. Cl. ............................ 713/176; 380/29; 380/529
(58) Field of Classification Search .................. 713/169, 713/176; 726/20; 700/214, 215; 382/100; 380/29, 259
See application file for complete search history.

(56) References Cited

U.S. PATENT DOCUMENTS

| | | | |
|---|---|---|---|
| 6,023,643 A * | 2/2000 | Jesionowski .................. | 700/214 |
| 6,295,361 B1 | 9/2001 | Kadansky et al. | |
| 6,567,914 B1 | 5/2003 | Just et al. | |
| 6,915,434 B1 | 7/2005 | Kuroda et al. | |
| 6,918,040 B2 | 7/2005 | Ries et al. | |
| 6,950,522 B1 | 9/2005 | Mitchell et al. | |
| 7,013,389 B1 | 3/2006 | Srivastava et al. | |
| 2002/0164035 A1 | 11/2002 | Yokota et al. | |
| 2003/0023847 A1* | 1/2003 | Ishibashi et al. .............. | 713/169 |
| 2003/0081787 A1 | 5/2003 | Kallahalla et al. | |
| 2003/0099362 A1 | 5/2003 | Rollins | |
| 2003/0223614 A1* | 12/2003 | Robins et al. ................. | 382/100 |
| 2005/0071591 A1 | 3/2005 | Goodman et al. | |
| 2005/0086471 A1 | 4/2005 | Spencer | |
| 2005/0204161 A1 | 9/2005 | Caronni | |
| 2005/0207570 A1 | 9/2005 | Yamamoto et al. | |
| 2005/0226423 A1 | 10/2005 | Li et al. | |
| 2006/0062383 A1 | 3/2006 | Kaneda et al. | |

OTHER PUBLICATIONS

U.S. Patent Application entitled "Selective Encryption of Data Stored on Removable Media in an Automated Data Storage Library", U.S. Appl. No. 11/470,670, filed Sep. 7, 2006, IBM, by inventors B. G. Goodman, J.A. Fisher, and L.G. Jesionowski.
Advanced Encryption Standard (AES), Federal Information Processing Standards Publication 197, Nov. 26, 2001, pp. 1-51.
"IBM TotalStorage Enterprise Tape System 3592—SCSI Reference" IBM Corporation, Document No. GA32-0466-02, Oct. 2005.
D.A. McGrew, et al., "The Galois/Counter Mode of Operation (GCM)", May 31, 2005, pp. 1-44.
"IEEE P1619.1/D8 Draft Standard Architecture for Encrypted Variable Block Storage Media", IEEE, 2006, pp. 1-26.

(Continued)

*Primary Examiner* — Vivek Srivastava
*Assistant Examiner* — Thong Truong
(74) *Attorney, Agent, or Firm* — Rabindranath Dutta; Konrad Raynes & Victor LLP (57) ABSTRACT

Provided are a method, system, and article of manufacture in which a non-reversible signature of a symmetric cryptographic key is computed, wherein the symmetric cryptographic key is used to symmetrically encrypt data at rest in a storage device. The non-reversible signature is stored in association with the symmetrically encrypted data at rest in the storage device. The non-reversible signature is used to determine validity of a cryptographic key provided by a host for accessing the symmetrically encrypted data at rest in the storage device.

20 Claims, 8 Drawing Sheets

OTHER PUBLICATIONS

U.S. Patent Application entitled "Configuring a Storage Drive to Communicate With Encryption and Key Managers", U.S. Appl. No. 11/530,022, filed Sep. 7, 2006, IBM, by inventors B.G. Goodman, G.A. Jaquette, L.G. Jesionowski and P.M. Greco.

U.S. Patent Application entitled "Keyless Encrypted Data", U.S. Appl. No. 11/530,008, filed Sep. 7, 2006, IBM, by inventors P.M. Greco and G.A. Jaquette.

U.S. Patent Application entitled "Key Generation and Retrieval Using Key Servers", U.S. Appl. No. 11/530,006, filed Sep. 7, 2006, IBM, by inventors P.M. Greco, .TJ. Hahn and G.A. Jaquette.

U.S. Patent Application entitled "Maintaining Encryption Key Integrity", U.S. Appl. No. 11/530,012, filed Sep. 7, 2006, IBM, by inventors P.M. Greco, M.J. Sandberg and S.J. Schaffer.

U.S. Patent Application entitled "Encryption Policy Based on Data Context Recognition", U.S. Appl. No. 11/530,011, filed Sep. 7, 2006, IBM, by inventors P.M. Greco, G.A. Jaquette, and W.E. Rhoten.

U.S. Patent Application entitled "Detection and Handling of Encryption Key and Initialization Vector", U.S. Appl. No. 11/530,010, filed Sep. 7, 2006, IBM, by inventors P.M. Greco, M.J. Sandberg and S.J. Schaffer.

U.S. Patent Application entitled "Recovering Remnant Encrypted Data on a Removable Storage Media", U.S. Appl. No. 11/530,021, filed Sep. 7, 2006, IBM, by inventors E.M. Dawson, P.M. Greco, G.A. Jaquette and J.M. Karp.

U.S. Patent Application entitled "Automatically Filling a Drive Table", U.S. Appl. No. 11/530,013, filed Sep. 7, 2006, IBM, by inventors T.J. Hahn and G.A. Jaquette.

U.S. Patent Application entitled "Validating an Encryption Key File on Removable Storage Media", U.S. Appl. No. 11/530,019, filed Sep. 7, 2006, IBM, by inventors H. Itagaki, J.M. Karp, H. Nakayama, T. Shiratori and P.M. Greco.

U.S. Patent Application entitled "Data Library Background Operations System Apparatus and Method", U.S. Appl. No. 11/470,964, filed Sep. 7, 2006, IBM, by inventors B.G. Goodman and L.G. Jesionowski.

U.S. Patent Application entitled "Secure Transmission of Cryptographic Key", U.S. Appl. No. 11/530,014, filed Sep. 7, 2006, IBM, by inventors P.M. Greco, M.J. Sandberg, and S.J. Schaffer.

U.S. Patent Application entitled "Rekeying Encryption for Removable Storage Media", U.S. Appl. No. 11/470,994, filed Sep. 7, 2006, IBM, by inventors J.A. Fisher, B.G. Goodman, G.A. Jaquette, and L.G. Jesionowski.

U.S. Patent Application entitled "Apparatus, System, and Method for Self-Describing Heterogeneous Magnetic Tape Formatting", U.S. Appl. No. 11/679,736, filed Feb. 27, 2007, IBM, by inventors, G.A. Jaquette, S.J. Schaffer and T. Shiratori.

U.S. Patent Application entitled "System and Method for Processing User Data in an Encryption Pipeline", U.S. Appl. No. 11/688,445, filed Mar. 20, 2007, IBM, by inventors P.M. Greco, S. Halevi, and G.A. Jaquette.

U.S. Patent Application entitled "Method, System and Apparatus for Dynamically Validating a Data Encryption Operation", U.S. Appl. No. 11/285,408, filed Nov. 22, 2005, IBM, by inventors P.M. Greco, M.J. Sandberg, and S.J. Schaffer.

U.S. Patent Application entitled "Use of Indirect Data Keys for Encrypted Tape Cartridges", U.S. Appl. No. 11/742,819, filed May 1, 2007, IBM, by inventors P.M. Greco, S. Halevi, and G.A. Jaquette.

\* cited by examiner

VERIFICATION OF ENCRYPTION KEY

BACKGROUND

1. Field

The disclosure relates to a method, system, and article of manufacture for the verification of cryptographic key.

2. Background

Symmetric key cryptography is a cryptographic mechanism in which a sender and receiver of a message share a single, common cryptographic key that is used to encrypt and decrypt the message. The single common cryptographic key is referred to as a symmetric cryptographic key. In contrast to symmetric key cryptography, public-key cryptography uses two cryptographic keys—a public key to encrypt messages and a private key to decrypt the messages. Symmetric key cryptography may also be referred to secret key cryptography and symmetrically encrypted data is data that has been encrypted with a symmetric cryptographic key.

The Advanced Encryption Standard (AES) is cryptographic mechanism that can be used to protect electronic data. The AES uses a type of symmetric cryptographic key called a symmetric block cipher that can encrypt and decrypt data. Encryption can convert data to an unintelligible form called encrypted data, and decrypting the encrypted data converts the data back into its original form. The AES algorithm is capable of using cryptographic keys of 128, 192, and 256 bits to encrypt and decrypt data in blocks of 128 bits. Further details of the AES may be found in the publication, "Specification for the Advanced Encryption Standard (AES)," Federal Information Processing Standards Publication 197, Nov. 26, 2001.

To further address the issues of electronic data storage protection, the "IEEE Std 1619.1" standard provides mechanisms for data protection by specifying encryption with authentication and length-expansion. The IEEE Std 1619.1 standard provides methods suitable for ensuring the privacy and integrity of stored data within applications requiring a high level of assurance. To this end, the IEEE Std 1619.1 standard specifies the AES cipher as used in the Galois/counter mode (GCM) of authentication and encryption of data. Further details of the IEEE Std 1619.1 standard may be found in the publication, "IEEE P1619.1™/D8 Draft Standard Architecture for Encrypted Variable Block Storage Media," Institute of Electrical and Electronics Engineers, Inc., June 2006. Further details of GCM may be found in the publication, "The Galois/Counter Mode of Operation (GCM)" by David A. McGrew and John Viega, May 31, 2005.

A cryptographic module that supports GCM may use the GCM algorithm that uses AES with 256-bit key, and such an algorithm may be referred to as "AES-256-GCM". The AES-256-GCM uses key identifiers that can be used by certain decryptors to determine cryptographic keys. The AES-256-GCM also uses initialization vectors (IV), where counter values determined from initialization vectors may be used in combination with cryptographic keys to encrypt and decrypt data. AES-GCM may refer to the usage of the GCM with AES with keys of any length.

SUMMARY OF THE DESCRIBED EMBODIMENTS

Provided are a method, system, and article of manufacture in which a non-reversible signature of a symmetric cryptographic key is computed, wherein the symmetric cryptographic key is used to symmetrically encrypt data at rest in a storage device. The non-reversible signature is stored in association with the symmetrically encrypted data at rest in the storage device. The non-reversible signature is used to determine validity of a cryptographic key provided by a host for accessing the symmetrically encrypted data at rest in the storage device.

In further embodiments, an encryption flag is set to indicate that the non-reversible signature of the symmetric cryptographic key has been stored in the storage device.

In still further embodiments, using the non-reversible signature to determine the validity of the cryptographic key provided by the host further comprises determining whether the encryption flag is set, in response to receiving the cryptographic key from the host. A signature of the received cryptographic key is computed by using a non-reversible signature calculator, in response to determining that the encryption flag is set. Decrypted data corresponding to the symmetrically encrypted data at rest is returned to the host, in response to determining that the computed signature of the received cryptographic key matches the stored non-reversible signature associated with the symmetrically encrypted data at rest.

In yet further embodiments, an error code is returned, wherein the error code indicates that an incorrect cryptographic key has been provided by the host, in response to determining that the computed signature of the received cryptographic key does not match the stored non-reversible signature associated with the symmetrically encrypted data at rest.

In additional embodiments, the encryption flag is set to one, and the non-reversible signature is computed from an arbitrary piece of data, an arbitrary initialization vector and the symmetric cryptographic key.

In yet additional embodiments, the non-reversible signature is a first non-reversible signature computed independently by a key signature calculator, wherein a second non-reversible signature is computed by a cryptographic unit, and wherein the cryptographic key provided by the host is valid if the first non-reversible signature computed independently by the key signature calculator is identical to the second non-reversible signature computed by the cryptographic unit.

Certain embodiments are implemented in a tape drive. Certain additional embodiments are implemented in a storage library, comprising at least one storage drive, and at least one cryptographic unit included in the at least one storage drive. In certain embodiments the storage library is a tape library.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Encryption may be used for protecting data at rest in a storage device, such as a tape drive. If symmetrically encrypted tape data cannot be read then it may be desirable to determine whether the cryptographic key provided to allow the data to be decrypted is the same as the cryptographic key that was used to encrypt the data.

Certain embodiments enable a tape drive (or any other storage device) to calculate a non-reversible signature of the symmetric encryption key and store that non-reversible signature with the encrypted data. Storing this non-reversible signature allows the tape drive to determine, in the future, whether the tape drive has been served the wrong key to read the encrypted data. If so, the tape drive can respond with an appropriate error code, rather than go into Error Recovery Procedures (ERPs) that may or may not be successful.

Certain embodiments calculate a non-reversible signature of the symmetric encryption key and store the non-reversible signature with the symmetrically encrypted data. Certain embodiments also store an encryption flag that indicates that a non-reversible signature was calculated and is being stored in association with the symmetrically encrypted data.

EXEMPLARY EMBODIMENTS

Figure 1:
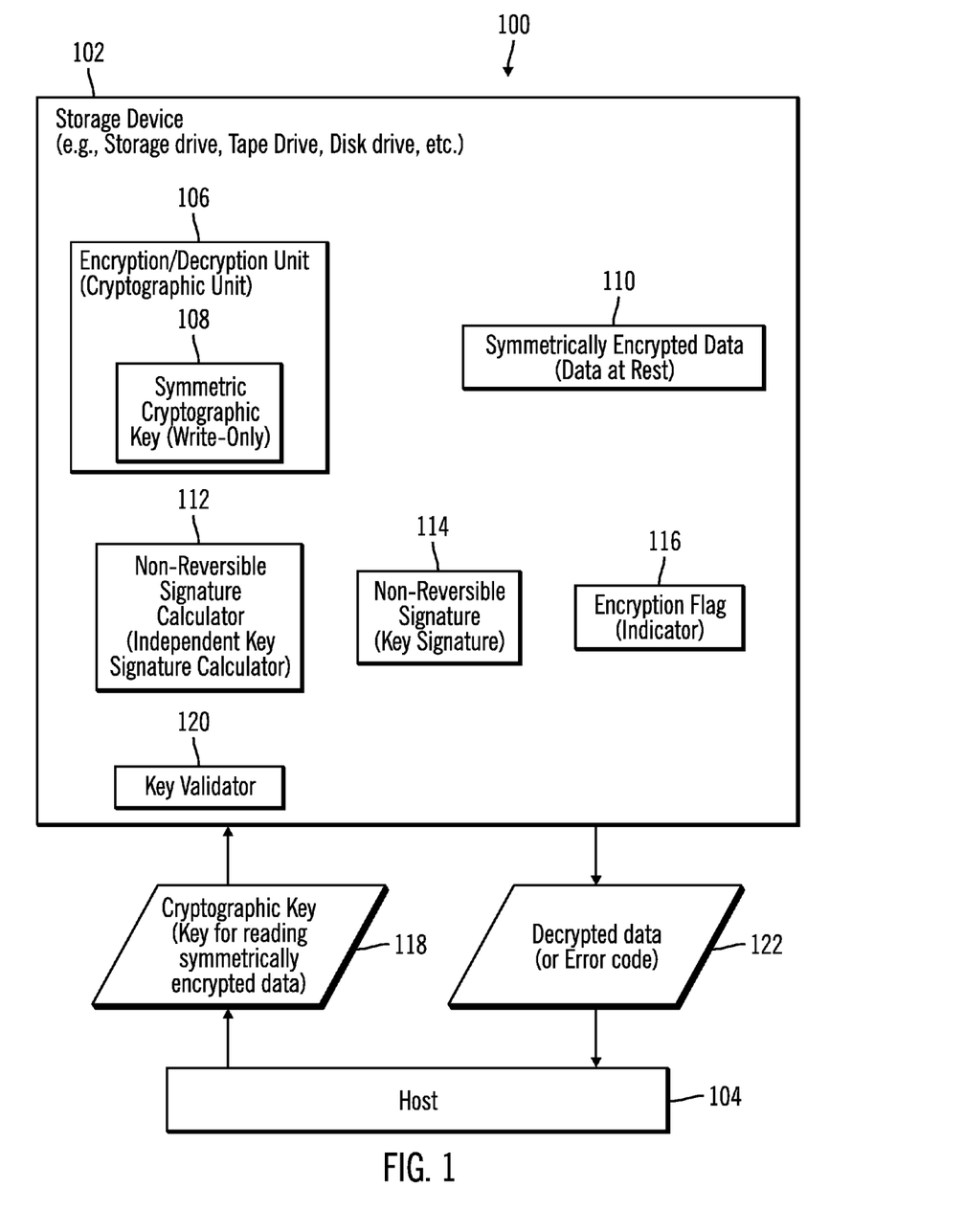
FIG. 1 illustrates a block diagram of a computing environment in accordance with certain embodiments.

FIG. 1 illustrates a block diagram of a computing environment 100 in accordance with certain embodiments. A storage device 102 is coupled to a host 104 either directly or over a network in the computing environment 100.

The storage device 102 may comprise any suitable storage device, such as a tape drive, a hard disk drive, a CD-ROM drive, or any other storage device known in the art. The storage device 102 may store tapes, disks, or any other suitable storage medium known in the art. The host 104 may comprise may comprise any suitable computational platform, including those presently known in the art, such as, a personal computer, a workstation, a mainframe, a midrange computer, a network appliance, a palm top computer, a telephony device, a blade computer, a hand held computer, etc.

The storage device 102 may include an encryption/decryption unit 106 that may be implemented in software, hardware, firmware, or any combination thereof. The encryption/decryption unit 106 may securely store a symmetric cryptographic key 108 that in certain embodiments is write-only, i.e., the symmetric cryptographic key 108 cannot be read by any process once the symmetric cryptographic key 108 has been written. In certain other embodiments, the encryption/decryption unit 106 may restrict the availability of the symmetric cryptographic key 108 to certain processes at certain times.

The storage device 102 includes symmetrically encrypted data 110 in a storage medium. The symmetrically encrypted data 110 is data at rest, where data at rest refers to data that is stored in a storage medium. Data at rest may also be defined as data that is not in motion. For example, data stored in a tape in the storage device 102 may be referred to as data at rest. The cryptographic key used for generating the symmetrically encrypted data 110 is the symmetric cryptographic key 108 stored in the encryption/decryption unit 106, where the encryption/decryption unit is also referred to as a cryptographic unit. The generation of the symmetric cryptographic key 108 may take place then the storage device 102 or a storage medium of the storage device 102 is first initialized or when the symmetrically encrypted data 110 is first written on a storage medium. The availability of the symmetric cryptographic key 108 may be restricted or the symmetric cryptographic key 108 may even be destroyed after the symmetrically encrypted data 110 has been written.

The storage device 102 may also include an application referred to as a non-reversible signature calculator 112, wherein the application may be implemented in software, hardware, firmware or any combination thereof. The non-reversible signature calculator calculates a non-reversible signature 114 of the symmetric cryptographic key 108. An entity in possession of the non-reversible signature 114 cannot determine the symmetric cryptographic key 108 from the non-reversible signature 114. The non-reversible signature 114 may be a string of numbers and may be stored in association with the symmetrically encrypted data 110 at rest in the storage device 102, wherein in certain embodiments a pointer data structure may link the non-reversible signature 114 to the symmetrically encrypted data 110 at rest.

The storage device 102 may also include an encryption flag 116 that is an indicator. The encryption flag 116 indicates that a non-reversible signature 114 has been associated with the symmetrically encrypted data 110 at rest in the storage device 102.

The host 104 may attempt to read the symmetrically encrypted data 110 at rest in the storage device 102. In order to read the symmetrically encrypted data 110, the host 104 may send a cryptographic key 118 to the storage device in association with a read request. A user of the host 118 may believe that the cryptographic key 118 is able to decrypt the symmetrically encrypted data 110. However, it is possible that an unauthorized host may be attempting to read the symmetrically encrypted data 110 with an erroneous cryptographic key 118.

An application, referred to as the key validator 120, included in the storage device 102 may use the non-reversible signature calculator 112 to generate the signature corresponding to the cryptographic key 118. If the generated signature matches the non-reversible signature 114, then the key validator 120 may determine that the cryptographic key 118 is a valid decryption key for decrypting the symmetrically encrypted data 110. The key validator 120 either by itself or in association with other applications may return the decrypted data or an error code 122 to the host 104, wherein the validated cryptographic key 118 is loaded into the encryption/decryption unit 106 as the key 108 and then used for decryption of the encrypted data 110 and used to produce decrypted data 122 which is returned if the cryptographic key 118 is valid. If the cryptographic key 118 is not validated an error code is returned 122. The "write-only" characterization of symmetric cryptographic key 108 means that the symmetric cryptographic key 108 may be placed in an Application Specific Integrated Circuit (ASIC) in a manner where it cannot be accessed (for security, anti-tampering, or anti-detection reasons). The symmetric cryptographic key 108 (or similar cryptographic keys within the encryption/decryption unit 106) may be used for both encryption and decryption operations.

Furthermore, the non-reversible signature calculator 112, the non-reversible signature 114, the encryption flag 116, and the key validator 120 may be part of, or may use the functions of the encryption/decryption unit 106.

Therefore, FIG. 1, illustrates certain embodiment in which a storage device 102 stores a non-reversible signature 114 corresponding to the symmetric cryptographic key 108 that has been used to generate the symmetrically encrypted data 110 at rest stored in the storage device 102. The storage device 102 can validate a cryptographic key 118 received from the host 104 by using the non-reversible signature 114. In certain alternative embodiments, the non-reversible signature calculator 112 and the key validator 120 may be maintained in a computational device that is outside the storage device 102.

Figure 2:
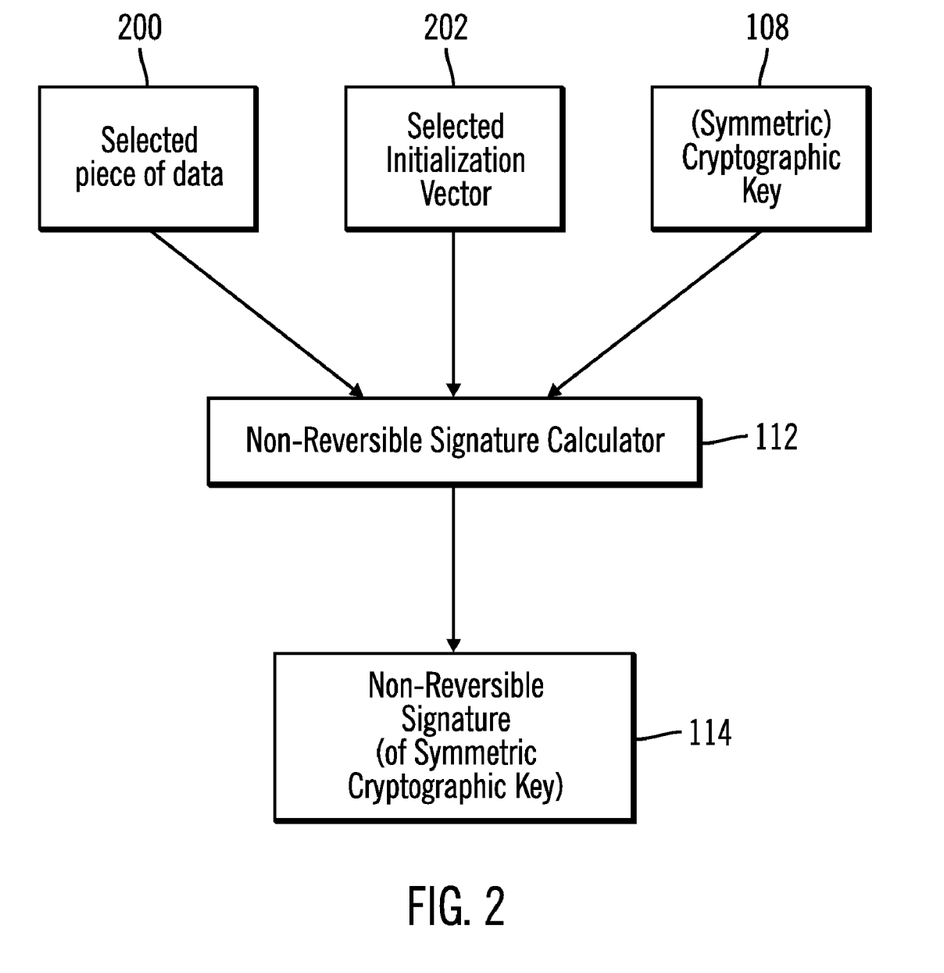
FIG. 2 illustrates a block diagram that illustrates how a non-reversible signature calculator computes the non-reversible signature of a symmetric cryptographic key, in accordance with certain embodiments.

FIG. 2 illustrates a block diagram that illustrates how a non-reversible signature calculator 112 computes the non-reversible signature 114 of a symmetric cryptographic key 108, in accordance with certain embodiments implemented in the computing environment 100.

The non-reversible signature calculator 112 can use an arbitrary piece of data, referred to as a selected piece of data 200, an arbitrary initialization vector, referred to as a selected initialization vector 202, and the symmetric cryptographic key 108 to compute the non-reversible signature 114 of the symmetric cryptographic key 108. It should be noted that the initialization vector 202 can be used to determine a counter value, where the counter value in combination with the cryptographic key 108 may be used to encrypt or decrypt data records in accordance with AES-GCM or other mechanisms. The value of the symmetric cryptographic key 108 may be made available to the non-reversible signature calculator 112 at the time of initialization of the storage device 102, at the time of initialization of a storage medium of the storage device 102, or when the symmetrically encrypted data 110 is first written.

Linear Tape-Open (or LTO) is a computer storage magnetic tape technology developed as an open alternative to the proprietary Digital Linear Tape (DLT). In an exemplary embodiment in conformance with the LTO-4 technology (which is version 4 of LTO), if the encryption flag 116 is "01" then the non-reversible signature 114 could be the 16-byte cipher text that results from AES encrypting a 16-byte block of all ONEs with a 32-byte User Key. It may be noted that this is equivalent to the 16-byte output (without GCM-MAC, where GCM-MAC refers to implementations of GCM with a message authentication code) that results from AES-MAC encrypting a 16-byte block of all ZEROes using an initialization vector of all 12 bytes of ONEs and the block counter set to 4 bytes of all ONEs with the 32-byte User Key. The User Key corresponds to a cryptographic key. Further details of GCM-MAC and AES-GCM are available in references indicated earlier in the "Background" section of the application.

Certain embodiments use the result of encryption of well-known (all ONES) data as the non-reversible signature 114. This method of signature calculation uses the hardware encryption capability of the storage device 102, and used a set of well-known data (all ONES) that will never be used in standard GCM encryption (because use of it is specifically disallowed by GCM).

Figure 3A:
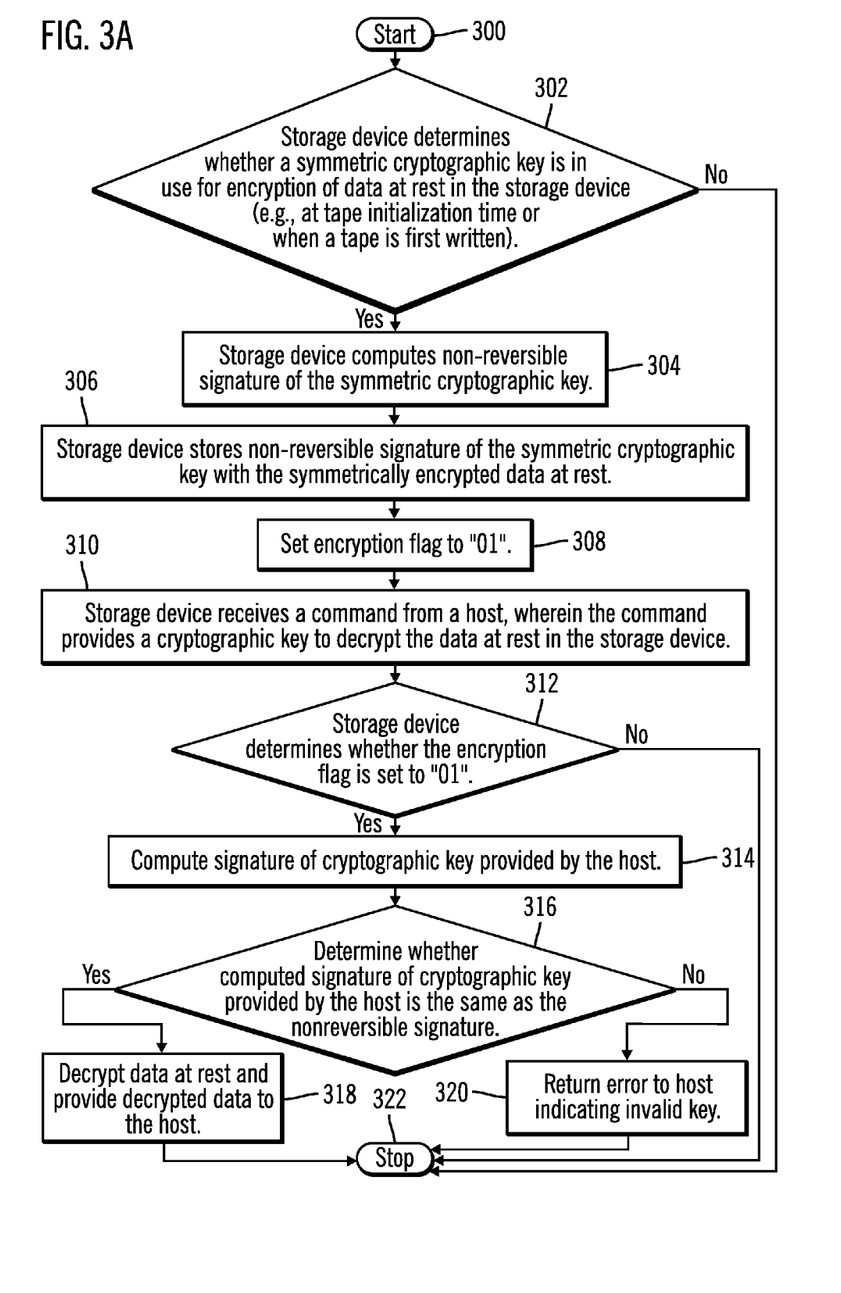
FIG. 3a illustrates a first flowchart that shows operations for the verification of a cryptographic key, in accordance with certain embodiments.

FIG. 3a illustrates a first flowchart that shows operations for the verification of a cryptographic key 118, in accordance with certain embodiments. The operations may be implemented in the storage device 102.

Control starts at block 300 and proceeds to block 302, where the storage device 102 determines whether a symmetric cryptographic key 108 is in use for encryption of data at rest in the storage device 102. In certain embodiments, in which the storage device 102 is a tape device, the operations performed in block 302 may be performed at tape initialization time or when a tape is first written.

The non-reversible signature calculator 112 of the storage device 102 computes (at block 304) the non-reversible signature 144 of the symmetric cryptographic key 108 by using the selected piece of data 200, the selected initialization vector 200 and the symmetric cryptographic key 108. The non-reversible signature calculator 112 of the storage device 102 stores (at block 306) the non-reversible signature 114 of the symmetric cryptographic key 108 with the symmetrically encrypted data 110 at rest in the storage device 102. Control proceeds to block 308, where the non-reversible signature calculator 112 of the storage device 102 sets the encryption flag 116 to "01" after associating the non-reversible signature 114 is with the symmetrically encrypted data 110.

The storage device receives (at block 310) a command from a host 104, wherein the command provides a cryptographic key 118 to decrypt the data at rest 110 in the storage device 102. The key validator 120 of storage device 102 determines (at block 312) whether the encryption flag 116 is set to "01". If so, then the key validator 120 of the storage device 102 computes (at block 314) the signature of cryptographic key 118 provided by the host 104 by using the non-reversible signature calculator 112, where the non-reversible signature calculator 112 uses the selected piece of data 200, the selected initialization vector 202 and the cryptographic key 118 to compute the signature.

The key validator 120 of the storage device 102 determines (at block 316) whether the computed signature of the cryptographic key 118 provided by the host 104 is the same as the non-reversible signature 114 stored in association with the symmetrically encrypted data 110 of the storage device 102. If so, the storage device 102 decrypts (at block 318) the decrypt data at rest, wherein the data at rest is the symmetrically encrypted data 110, and provides the decrypted data 122 to the host 102.

If at block 316, the key validator 120 of the storage device 102 determines that the computed signature of the cryptographic key 118 provided by the host 104 is not the same as the non-reversible signature 114 stored in association with the symmetrically encrypted data 110 of the storage device 102, then the key validator 120 returns (at block 320) an error message to the host 102, wherein the error message indicates that an invalid cryptographic key was provided by the host 104. From blocks 318 and 320 control proceeds to block 322 where the process stops.

The process also stops (at block 322) if at block 302 the storage device 102 determines that a symmetric cryptographic key 108 is not in use for encryption of data at rest in the storage device 102, or if at block 312 the storage device 102 determines that the encryption flag 116 is not set to "01".

Therefore, FIG. 3a illustrates certain embodiments, in which a non-reversible signature 114 of the symmetric encryption key 108 is calculated and stored with the symmetrically encrypted data 110. While use of non-reversible signatures is known in cryptographic systems, certain embodiments use non-reversible signatures in the context of encryption of data at rest to determine whether a cryptographic key 118 served to read symmetrically encrypted data 110 is a valid key.

Figure 3B:
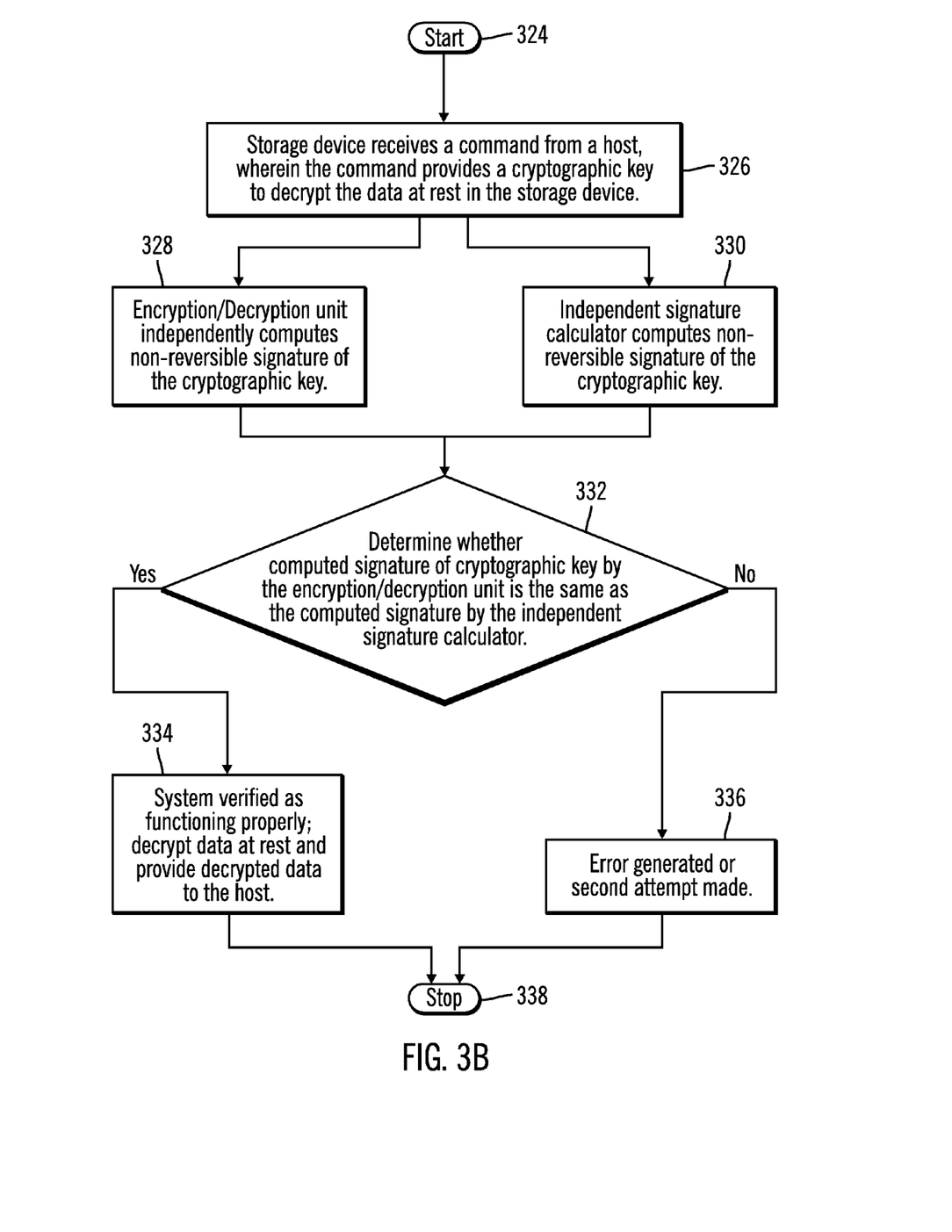
FIG. 3b illustrates a second flowchart that shows operations for the verification of a cryptographic key, in accordance with certain embodiments.

FIG. 3b illustrates a second flowchart that shows operations for the verification of a cryptographic key, in accordance with certain embodiments. The operations may be implemented in the storage device 102. In certain embodiments illustrated in FIG. 3b, the key signature 114 is generated by an independent key signature calculator 112.

Control starts at block 324, and proceeds to block 326 where the storage device 102 receives a command from a host 104, wherein the command provides a cryptographic key 118 to decrypt the data at rest 110 in the storage device 102.

In such embodiments, when the cryptographic key 118 is loaded into the encryption/decryption unit 106 for use as the symmetric cryptographic key 108, then the encryption/decryption unit 106 can compute (at block 328) the key signature using the encryption/decryption unit's 106 independent implementation of the independent signature calculator 112 and compare (at block 332) the computed key signature with the key signature computed (at block 330) by the independent signature calculator 112. If the key signature computed by the encryption/decryption unit 106 and the key signature computed by the independent signature calculator 112 are identical, then the cryptographic key 118 was properly loaded into the encryption/decryption unit 106 and the system is verified as functioning correctly (block 334) and the data at rest is decrypted to provide decrypted data 122 to the host 104. If the key signature computed by the encryption/decryption unit 106 and the key signature computed by the independent signature calculator 112 are not identical, then an error may be generated or a second attempt may be made (block 336). Control proceeds to block 338 from blocks 334 and 336 and the process stops.

Such embodiments illustrated in FIG. 3b ensure that the key 118 sent from the host 104 is correctly loaded into the encryption/decryption unit 106. The correct loading of the key 118 may be performed whether or not the non-reversible signature is stored along with symmetrically encrypted data 110. In certain exemplary embodiments the independent signature calculator 112 is implemented in firmware, and the encryption/decryption unit 106 is implemented in hardware, and the encryption/decryption unit 106 is capable of calculating the signatures by the same method used by the independent signature calculator 112.

Storage Library and Storage Device Related Embodiment

Figure 4:
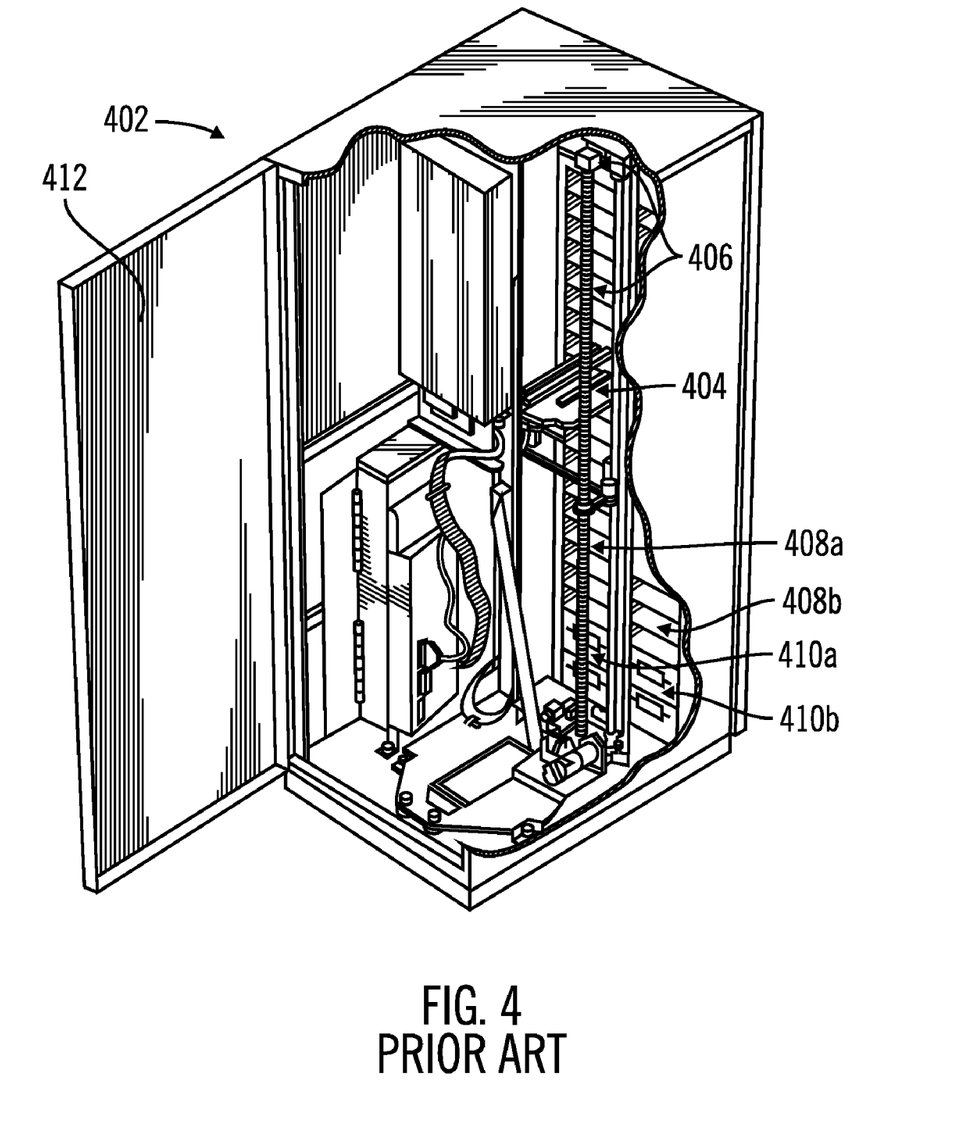
FIG. 4 illustrates an embodiment of a storage library, in accordance with certain embodiments.
Figure 5:
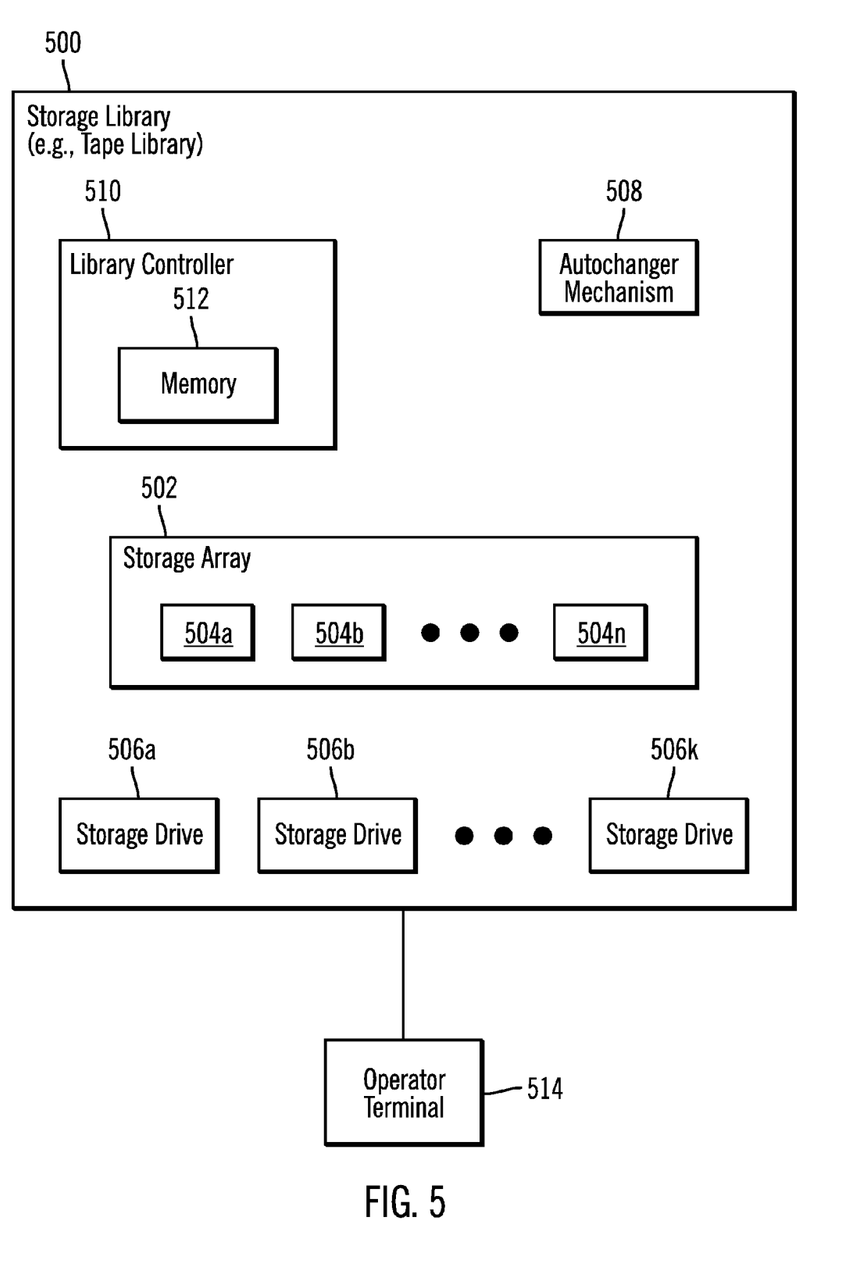
FIG. 5 illustrates an embodiment of components in a storage library, in accordance with certain embodiments.
Figure 6:
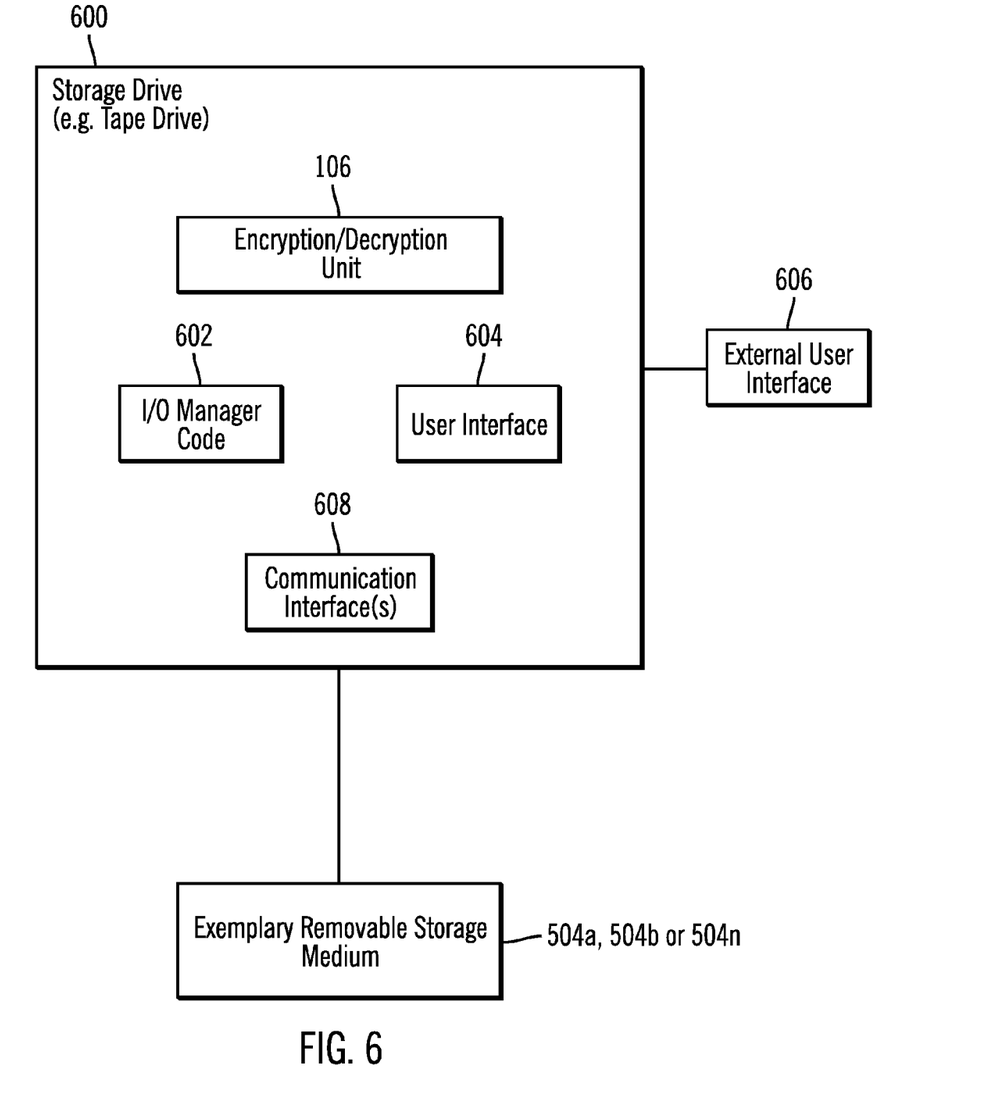
FIG. 6 illustrates an embodiment of components of a storage drive capable of interfacing with a removable storage media, in accordance with certain embodiments.

FIGS. 1, 2, 3a, 3b have described certain embodiments which illustrate certain interactions of an encryption/decryption unit 106 with other elements included in the storage device 102 and the host 104. FIGS. 4-6 illustrate additional embodiments in which the encryption/decryption unit 106 is included a storage drive, such as a tape drive, wherein in certain embodiments one or more storage drive may be implemented in a storage library.

FIG. 4 illustrates a storage library, such as an automated tape library 402, known in the prior art. The tape library 402 includes a library controller, an input/output station, a picker assembly 404, a carriage assembly 406, storage cells 408a, 408b, and optical disk drives (not shown). The term "library element" as used herein refers to any slot in the automated tape library 402 in which storage cartridges may be disposed, e.g., the input/output stations, the storage cells 408a, 408b, etc. The library controller includes a processor, RAM, and other controls and interfaces to direct the actions of the library components. The library controller further interacts with a host processor to respond to library commands transmitted from the host processor. The input/output station is the opening through which the user may insert or remove a cartridge. An operator panel on the outside of the box housing the tape library 402 allows the user to communicate with the library controller. When adding a cartridge through the input/output slot, the user may indicate the addition of a cartridge using the operator panel. The tape library 402 also includes an access door 412 through which the user may add or remove cartridges maintained in the storage cells 408a, 408b.

The tape library 402 has two columns of storage cells 408a, 408b and storage drives 410a, 410b that perform read and write operations with respect to the storage media cartridges. A picker assembly 404 is capable of manipulating the storage media cartridges in the library elements. A carriage assembly 406 moves the picker assembly 404, and any media storage cartridge held by the picker assembly 404, among the library elements. The carriage assembly 406 transports the picker assembly 404 to a destination library element. The picker assembly 404 can rotate to turn the storage media cartridge over. The picker assembly 404 has a finger mechanism to remove or insert a storage media cartridge to a library element. Once inserted in the storage drive 410a, 410b, data can be read from the storage media cartridge and sent to a host processor. Data transmitted from the host processor can be written to the storage media cartridge inserted in a storage drive 410a, 410b. One or more of the storage cells 408a, 408b in each column may comprise and Input/Output slot through which a user may remove a storage media cartridge from the tape library 402 or can insert a storage media cartridge into the tape library 402.

In further embodiments, the tape library 402 may include distributed computing components, such as distributed controller, distributed storage cells and distributed picker assemblies. Yet further, the tape library 402 may be partitioned into one or more logical libraries having multiple storage drives. Each storage drive may be configured independently of any other drive. In addition, groups of storage drives may be configured at the same time or with the same settings. This may include all storage drives in a frame, all storage drives in a logical library, all storage drives in a physical library, or all storage drives selected from a list.

FIG. 5 illustrates an embodiment of an automated storage library 500 including a storage array 502, such as the storage cell 408a, 408b (FIG. 4), including removable storage media 504a, 504b, . . . 504n; storage drives 506a, 506b, . . . 506k, such as a tape drive, optical disk drive or other interface to which a removable storage media is coupled to for access; an autochanger mechanism 508 to transfer removable storage media 504a . . . 504n between the storage array 502 and storage drive 506a . . . 506k, such as the picker assembly 404 (FIG. 4); and a library controller 510.

The removable storage media 504a . . . 504n may comprise any type of media on which data may be stored and which may serve as removable media, including but not limited to magnetic media (such as magnetic tape or disks), optical media (such as optical tape or disks), electronic media (such as PROM, EEPROM, flash PROM, MRAM, etc.), or other suitable media. In certain embodiments, the removable storage media has a cartridge housing, such as the case with a magnetic tape cartridge or a removable disk drive.

In certain embodiments, the library controller 510 is comprised of a microprocessor and various controls and interfaces to control the operation of the components in the automated library 500, including the autochanger mechanism 508 and storage drives 506a . . . 506k. The library controller 510 utilizes a memory 512 to store various information, such as a storage media map maintaining information on the location of removable storage media 504a . . . 504n in the library 500, including the content of the library elements in the storage array 502. The library controller 510 may comprise a single processing unit or distributed processing units.

The library controller 510 may further manage read/write operations with respect to removable storage media 504a . . . 504n in the storage library 500. A library operator may directly control operations and the management of removable storage media 504a ... 504n through an operator terminal 514 coupled to the library 500, comprising of a display device and keyboard, to interface with the library controller 510. Additionally, a host system (not shown) may send commands to the library controller 510 to control operations within the automated library 500 or perform read or write operations on volumes within removable storage media 504a ... 504n managed by the library 500, where the host system may communicate with the library 500 over a network or through a direct cable connection.

FIG. 6 illustrates an embodiment of a storage drive 600 that is capable of performing I/O operations with respect to a coupled exemplary removable storage media 504a, 504b, or 504n that are capable of being inserted into the storage drive 600. The storage drive 600 includes I/O manager code 602 to perform read/write operations with respect to a coupled removable storage media 504a, 504b, or 504n. The storage drive 600 includes a user interface 604 comprising user controls on the storage drive 600 housing to configure and control the storage drive 600. Further, in certain embodiments, an external user interface 606 may optionally be coupled to the storage drive 600 providing additional user controls used to configure and control the storage drive 600. The storage drive 600 may correspond to the storage device 102 (shown in FIG. 1) and may include one or more communication interfaces 608, the encryption/decryption unit 106 (shown in FIG. 1), and other elements shown in the storage device 102 of FIG. 1. In certain embodiments the symmetrically encrypted data 110 (shown in FIG. 1) may be included in the storage drive 600 and correspond to one of the removable storage media 504a, 504b or 504n.

The user interface 604 and optional external user interface 606 may include user interface elements for interacting with the storage drives 506a ... 506k, such as an eject button for manually unloading removable storage media 504a, 504b, or 504n, up/down buttons for navigating a list of items, enter/exit buttons for selecting items or exiting from a menu or list, and one or more status displays (e.g., a light or LED (Light Emitting Diode), a numeric display, and alphanumeric display, etc.) The external user interface 606 may comprise a computer, workstation, personal computer, palm computer, web user interface, proprietary user interface, or any other device capable of providing a user interface for the storage drives 506a ... 506k.

The encryption/decryption unit 106 and I/O manager code 602 may be implemented as hardware logic in the storage drive 600 or in computer executable instructions that are accessed and executed by a processor (not shown) in the storage drive 600. In certain embodiments the storage drive 600 is a tape drive.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drive, floppy disk, tape, etc.), optical storage (CD-ROM, optical disk, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encodes may also comprise transmission signals propagating through space or a transmission media, such as an optical fiber, copper wire, etc. The transmission signal in which the code or logic is encoded may further comprise a wireless signal, satellite transmission, radio waves, infrared signals, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognized that many modifications may be made without departing from the scope of embodiments, and that the article of manufacture may comprise any information bearing medium. For example, the article of manufacture comprises a storage medium having stored therein instructions that when executed by a machine results in certain operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disk (DVD).

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 7:
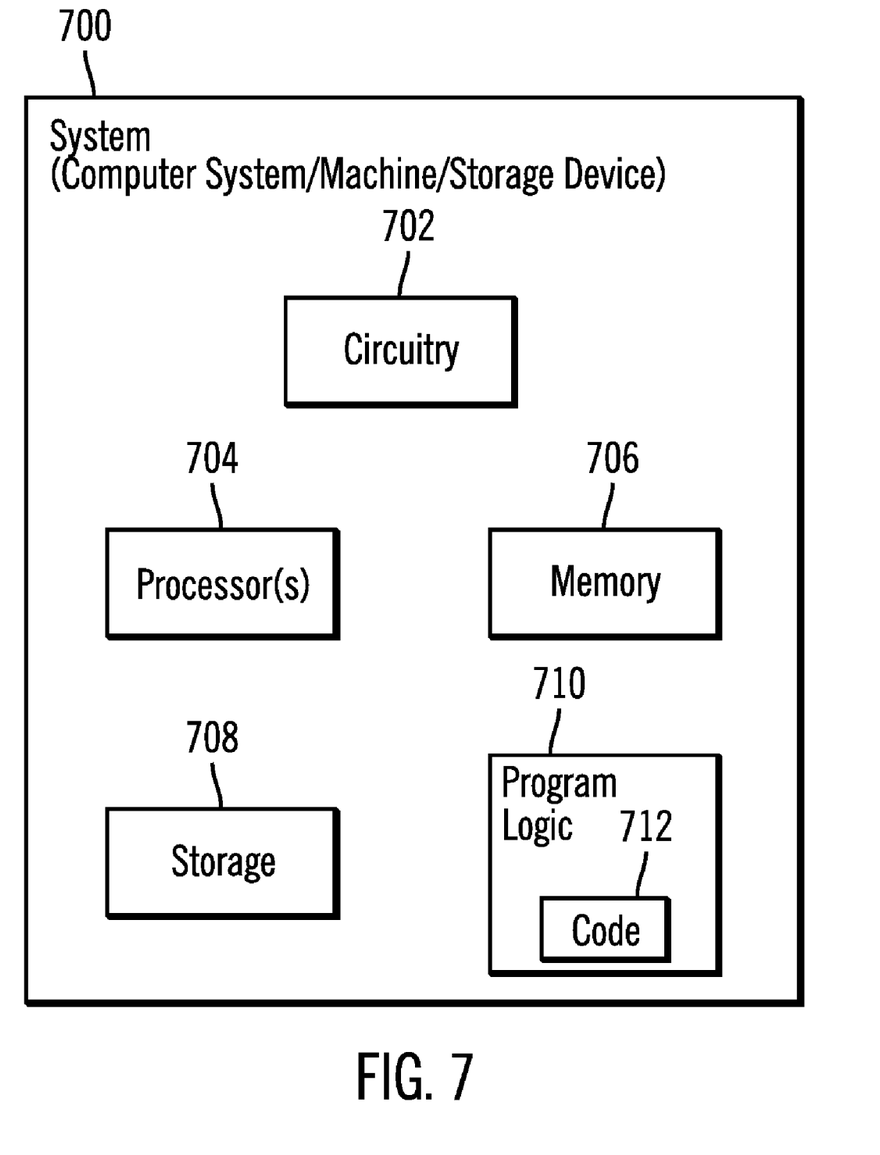
FIG. 7 illustrates the architecture of computing system, wherein in certain embodiments elements of the computing environment of FIG. 1 may be implemented in accordance with the architecture of the computing system.

FIG. 7 illustrates an exemplary computer system 700, wherein in certain embodiments the storage device 102 or the host 104 of the computing environment 100 of FIG. 1 may be implemented in accordance with the computer architecture of the computer system 700. The computer system 700 may also be referred to as a system, and may include a circuitry 702 that may in certain embodiments include a processor 704. The system 700 may also include a memory 706 (e.g., a volatile memory device), and storage 708. Certain elements of the system 700 may or may not be found in the storage device 102 or the host 104 of FIG. 1. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed towards a method for deploying computing infrastructure by a person or via automated processing. Certain other embodiments may be directed towards integrating computer-readable code into a computing system, wherein the code in combination with the computing system is enabled to perform the operations described earlier.

At least certain of the operations illustrated in FIGS. 3a and 3b may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-7 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching. *IEEE P1619.1 is a trademark or registered trademark of Institute of Electrical and Electronics Engineers, Inc.

What is claimed is:

1. A method, comprising:
   in response to a tape being written onto for a first time, determining, by a tape drive having the tape, whether a symmetric cryptographic key is in use to encrypt data at rest in the tape, wherein the tape drive has plurality of tapes, wherein the tape drive comprises a hardware device;
   computing, by the tape drive, a non-reversible signature of the symmetric cryptographic key used to symmetrically encrypt data at rest in the tape that is within a storage library having a library controller and an autochanger mechanism to transfer the tape accessible to the tape drive;
   storing, by the tape drive, the non-reversible signature in association with the symmetrically encrypted data at rest in the tape accessible to the tape drive;
   receiving, by the tape drive, a command from a host, wherein the command provides a cryptographic key to the tape drive for accessing the symmetrically encrypted data at rest in the tape;
   computing, by the tape drive, a signature of the cryptographic key provided by the host by using a non-reversible signature calculator; and
   in response to determining, by the tape drive, that the computed signature of the received cryptographic key does not match the stored non-reversible signature associated with the symmetrically encrypted data at rest, attempting, by the tape drive, for a second time to determine validity of any cryptographic key provided by the host for accessing the symmetrically encrypted data at rest in the tape.

2. The method of claim 1, further comprising:
   setting an encryption flag to "01" to indicate that the non-reversible signature of the symmetric cryptographic key has been stored in the tape drive, wherein if the encryption flag is set to "01" then the non-reversible signature is a 16-byte cipher text generated by Advanced Encryption Standard (AES) encrypting a 16-byte block of all ONEs with a 32-byte user key, and wherein the symmetric cryptographic key is destroyed after the symmetrically encrypted data at rest has been written.

3. The method of claim 2, further comprising:
   returning decrypted data corresponding to the symmetrically encrypted data at rest to the host, in response to determining that the computed signature of the received cryptographic key matches the stored non-reversible signature associated with the symmetrically encrypted data at rest.

4. The method of claim 3, further comprising:
returning an error code indicating that an incorrect cryptographic key has been provided by the host.

5. The method of claim 2, wherein the non-reversible signature is computed from an arbitrary piece of data, an arbitrary initialization vector and the symmetric cryptographic key.

6. The method of claim 1, wherein the non-reversible signature is a first non-reversible signature computed independently by a key signature calculator implemented within the tape drive, wherein a second non-reversible signature is computed by a cryptographic unit implemented within the tape drive, and wherein the cryptographic key provided by the host is valid if the first non-reversible signature computed independently by the key signature calculator is identical to the second non-reversible signature computed by the cryptographic unit.

7. A tape drive in communication with a host, comprising:
memory; and
processor coupled to the memory, wherein the processor performs operations, the operations comprising:
in response to a tape being written onto for a first time, determining whether a symmetric cryptographic key is in use to encrypt data at rest in the tape, wherein the tape drive has plurality of tapes;
computing a non-reversible signature of the symmetric cryptographic key used to symmetrically encrypt data at rest in the tape that is within a storage library having a library controller and an autochanger mechanism to transfer the tape accessible to the tape drive;
storing the non-reversible signature in association with the symmetrically encrypted data at rest in the tape accessible to the tape drive;
receiving a command from the host, wherein the command provides a cryptographic key for accessing the symmetrically encrypted data at rest in the tape;
computing a signature of the cryptographic key provided by the host by using a non-reversible signature calculator; and
in response to determining that the computed signature of the received cryptographic key does not match the stored non-reversible signature associated with the symmetrically encrypted data at rest, attempting for a second time to determine validity of any cryptographic key provided by the host for accessing the symmetrically encrypted data at rest in the tape.

8. The tape drive of claim 7, the operations further comprising:
setting an encryption flag to "01" to indicate that the non-reversible signature of the symmetric cryptographic key has been stored in the tape drive, wherein if the encryption flag is set to "01" then the non-reversible signature is a 16-byte cipher text generated by Advanced Encryption Standard (AES) encrypting a 16-byte block of all ONEs with a 32-byte user key, and wherein the symmetric cryptographic key is destroyed after the symmetrically encrypted data at rest has been written.

9. The tape drive of claim 8, the operations further comprising:
returning decrypted data corresponding to the symmetrically encrypted data at rest to the host, in response to determining that the computed signature of the received cryptographic key matches the stored non-reversible signature associated with the symmetrically encrypted data at rest.

10. The tape drive of claim 9, the operations further comprising:
returning an error code indicating that an incorrect cryptographic key has been provided by the host.

11. The tape drive of claim 8, wherein the non-reversible signature is computed from an arbitrary piece of data, an arbitrary initialization vector and the symmetric cryptographic key.

12. The tape drive of claim 7, wherein the non-reversible signature is a first non-reversible signature computed independently by a key signature calculator implemented within the tape drive, wherein a second non-reversible signature is computed by a cryptographic unit implemented within the tape drive, and wherein the cryptographic key provided by the host is valid if the first non-reversible signature computed independently by the key signature calculator is identical to the second non-reversible signature computed by the cryptographic unit.

13. An article of manufacture comprising hardware or a combination of hardware and software, wherein the article of manufacture includes machine readable instructions, wherein the machine readable instructions cause operations in a storage device, the operations comprising:
in response to a tape being written onto for a first time, determining, by a tape drive having the tape, whether a symmetric cryptographic key is in use to encrypt data at rest in the tape, wherein the tape drive has plurality of tapes;
computing, by the tape drive, a non-reversible signature of the symmetric cryptographic key used to symmetrically encrypt data at rest in the tape that is within a storage library having a library controller and an autochanger mechanism to transfer the tape accessible to the tape drive;
storing, by the tape drive, the non-reversible signature in association with the symmetrically encrypted data at rest in the tape accessible to the tape drive;
receiving, by the tape drive, a command from a host, wherein the command provides a cryptographic key to the tape drive for accessing the symmetrically encrypted data at rest in the tape;
computing, by the tape drive, a signature of the cryptographic key provided by the host by using a non-reversible signature calculator; and
in response to determining, by the tape drive, that the computed signature of the received cryptographic key does not match the stored non-reversible signature associated with the symmetrically encrypted data at rest, attempting, by the tape drive, for a second time to determine validity of any cryptographic key provided by the host for accessing the symmetrically encrypted data at rest in the tape.

14. The article of manufacture of claim 13, the operations further comprising:
setting an encryption flag to "01" to indicate that the non-reversible signature of the symmetric cryptographic key has been stored in the tape drive, wherein if the encryption flag is set to "01" then the non-reversible signature is a 16-byte cipher text generated by Advanced Encryption Standard (AES) encrypting a 16-byte block of all ONEs with a 32-byte user key, and wherein the symmetric cryptographic key is destroyed after the symmetrically encrypted data at rest has been written.

15. The article of manufacture of claim 14, the operations further comprising:
returning decrypted data corresponding to the symmetrically encrypted data at rest to the host, in response to determining that the computed signature of the received cryptographic key matches the stored non-reversible signature associated with the symmetrically encrypted data at rest.

16. The article of manufacture of claim 15, the operations further comprising:
   returning an error code indicating that an incorrect cryptographic key has been provided by the host.

17. The article of manufacture of claim 14, wherein the non-reversible signature is computed from an arbitrary piece of data, an arbitrary initialization vector and the symmetric cryptographic key.

18. The article of manufacture of claim 13, wherein the non-reversible signature is a first non-reversible signature computed independently by a key signature calculator implemented within the tape drive, wherein a second non-reversible signature is computed by a cryptographic unit implemented within the tape drive, and wherein the cryptographic key provided by the host is valid if the first non-reversible signature computed independently by the key signature calculator is identical to the second non-reversible signature computed by the cryptographic unit.

19. A storage library in communication with a host, comprising:
   a tape drive having a plurality of tapes;
   at least one cryptographic unit included in the tape drive;
   a memory coupled to the tape drive; and
   a processor coupled to the memory, wherein the processor performs operations, the operations comprising:
   in response to a tape being written onto for a first time, determining, by the tape drive having the tape, whether a symmetric cryptographic key is in use to encrypt data at rest in the tape;
   computing, by the tape drive, a non-reversible signature of the symmetric cryptographic key used to symmetrically encrypt data at rest in the tape, wherein the storage library has a library controller and an autochanger mechanism to transfer the tape accessible to the tape drive;
   storing, by the tape drive, the non-reversible signature in association with the symmetrically encrypted data at rest in the tape accessible to the tape drive;
   receiving, by the tape drive, a command from a host, wherein the command provides a cryptographic key to the tape drive for accessing the symmetrically encrypted data at rest in the tape;
   computing, by the tape drive, a signature of the cryptographic key provided by the host by using a non-reversible signature calculator; and
   in response to determining, by the tape drive, that the computed signature of the received cryptographic key does not match the stored non-reversible signature associated with the symmetrically encrypted data at rest, attempting, by the tape drive, for a second time to determine validity of any cryptographic key provided by the host for accessing the symmetrically encrypted data at rest in the tape.

20. The storage library of claim 19, the operations further comprising:
   setting an encryption flag to "01" to indicate that the non-reversible signature of the symmetric cryptographic key has been stored in the tape drive, wherein if the encryption flag is set to "01" then the non-reversible signature is a 16-byte cipher text generated by Advanced Encryption Standard (AES) encrypting a 16-byte block of all ONEs with a 32-byte user key, and wherein the symmetric cryptographic key is destroyed after the symmetrically encrypted data at rest has been written.

* * * * *